United States Patent
Gautney (10) Patent No.: US 7,240,104 B2
(45) Date of Patent: Jul. 3, 2007

(54) METHOD AND APPARATUS FOR MANAGING RESOURCES STORED ON A COMMUNICATION DEVICE

(75) Inventor: Charles W Gautney, Germantown, MD (US)

(73) Assignee: Defywire, Inc., Reston, VA (US)

( * ) Notice: Subject to any disclaimer, the term of this patent is extended or adjusted under 35 U.S.C. 154(b) by 0 days.

(21) Appl. No.: 10/224,486

(22) Filed: Aug. 21, 2002

(65) Prior Publication Data

US 2004/0039887 A1  Feb. 26, 2004

(51) Int. Cl.
G06F 15/177 (2006.01)
H04M 3/22 (2006.01)
(52) U.S. Cl. ................. 709/221; 707/206; 455/419
(58) Field of Classification Search ........... 709/221; 707/206; 455/419
See application file for complete search history.

(56) References Cited

U.S. PATENT DOCUMENTS

| | | | |
|---|---|---|---|
| 5,754,864 A | 5/1998 | Hill | |
| 5,761,504 A | 6/1998 | Corrigan et al. | |
| 5,813,015 A * | 9/1998 | Pascoe | 707/200 |
| 5,835,724 A | 11/1998 | Smith | |
| 6,016,311 A | 1/2000 | Gilbert et al. | |
| 6,032,227 A * | 2/2000 | Shaheen et al. | 711/129 |
| 6,065,120 A | 5/2000 | Laursen et al. | |
| 6,148,405 A | 11/2000 | Liao et al. | |
| 6,178,448 B1 * | 1/2001 | Gray et al. | 709/224 |
| 6,233,608 B1 | 5/2001 | Laursen et al. | |
| 6,427,227 B1 | 7/2002 | Chamberlain | |
| 6,456,603 B1 | 9/2002 | Ismailov et al. | |
| 6,460,076 B1 | 10/2002 | Srinivasan | |
| 6,480,957 B1 | 11/2002 | Liao et al. | |
| 6,484,174 B1 | 11/2002 | Wall et al. | |
| 6,490,616 B1 * | 12/2002 | Maryka et al. | 709/222 |
| 6,490,624 B1 | 12/2002 | Sampson et al. | |
| 6,532,225 B1 | 3/2003 | Chang et al. | |
| 6,574,239 B1 | 6/2003 | Dowling et al. | |
| 6,650,905 B1 | 11/2003 | Toskala et al. | |
| 6,654,610 B1 | 11/2003 | Chen et al. | |
| 2001/0006517 A1 | 7/2001 | Lin et al. | |
| 2001/0052052 A1 * | 12/2001 | Peng | 711/133 |
| 2002/0062361 A1 | 5/2002 | Kivipuro et al. | |
| 2002/0065083 A1 | 5/2002 | Patel | |
| 2002/0083160 A1 * | 6/2002 | Middleton | 709/221 |
| 2002/0123336 A1 * | 9/2002 | Kamada | 455/420 |
| 2003/0005427 A1 | 1/2003 | Herrero | |
| 2003/0032417 A1 * | 2/2003 | Minear et al. | 455/419 |

(Continued)

OTHER PUBLICATIONS

Yokoyama et al. 'A memory management architecture for a mobile computing environment.' IEEE, 2000, pp. 23-28.*

Primary Examiner—Saleh Najjar
Assistant Examiner—David Lazaro
(74) Attorney, Agent, or Firm—DLA Piper US LLP (57) ABSTRACT

Resources at a communication device having its own memory device are managed. A cleanup request is received at the communication device over a bandwidth-limited connection. An available space on the memory device of the communication device at a first time is less than a predetermined amount. The first time is before the receiving of the cleanup request. Data stored at the memory device of the communication device is deleted based on the cleanup request. An available-space indicator is sent from the communication device at a second time. The second time is after the first time and after the deleting of the data.

27 Claims, 6 Drawing Sheets

U.S. PATENT DOCUMENTS

2003/0061273 A1* 3/2003 Hayduk ................. 709/203
2003/0110190 A1* 6/2003 Achiwa et al. ............ 707/203
2003/0159136 A1* 8/2003 Huang et al. ............. 717/171
2003/0217358 A1 11/2003 Thurston et al.
2003/0225797 A1* 12/2003 Shields et al. ............ 707/202
2004/0158829 A1* 8/2004 Beresin et al. ............ 717/178

* cited by examiner

| User Identifier | Application-session Identifier | Available Volatile Memory | Available Non-Volatile Storage | Available-Space-Request Timer |
|---|---|---|---|---|
| jsmith | 77CH67 | 34 | 42 | 120 |

METHOD AND APPARATUS FOR MANAGING RESOURCES STORED ON A COMMUNICATION DEVICE

CROSS-REFERENCE TO RELATED APPLICATIONS

This application is related to co-pending U.S. patent application Ser. No. 10/224,331, entitled "Method and Apparatus for Establishing Multiple Bandwidth-Limited Connections for a Communication Device;" and U.S. patent application Ser. No. 10/224,476, entitled "Method and Apparatus for Just-in-Time Provisioning Application-Related Information at a Communication Device;" all filed on the same day, the disclosures of which are incorporated herein by reference.

BACKGROUND

The invention relates generally to communication devices and communication systems. More specifically, the invention relates to a method and apparatus for managing resources stored on a communication device.

Communication devices, such as for example wireless phones, are increasingly incorporating additional software functionality beyond that needed to establish a communication connection. For example, communication devices can include software applications such as calendars, contact lists, calculators, etc. Moreover, additional applications based on, for example, Java languages such as Java 2 Micro Edition (J2ME) are being developed for use with communication devices. These software applications also typically involve a sizable amount of application data. For example, a software application that provides the functionality of a contact list also uses application data relating to the contact's name, phone number, etc.

These communication devices, however, typically have storage devices with a limited storage capacity. Accordingly, the limited storage capacity of typical communication devices often limits the number of applications and the amount of application-related information that can be stored on a communication device at any given time.

One known way to accommodate a large number of software applications and their related data is to remove the applications when not needed or not being used frequently or recently. Such known removal is performed by removing an entire application and all of its related data. For example, as an application is needed, an unused application and all of its related data is first deleted from the communication device to make room for the provisioning of the new application and its related data.

This known way of managing the information stored on the memory devices of communication devices, however, suffers shortcomings. For example, removing an entire application and its related data may free more memory space than is actually needed to provision the new application. This can involve more time than would be otherwise be involved to free only the amount of memory needed. In addition, removing an entire application and its related data also removes an indication to the user that that application and its related data may be available again in the future. Moreover, requiring user-initiated actions to select and/or remove applications overburdens the users and unnecessarily complicates the operation of communication devices.

Thus, a need exists for a more effective form of managing the storage of software applications and their related data on the storage devices of communication devices.

SUMMARY OF THE INVENTION

Resources at a communication device having its own memory device are managed. A cleanup request is received at the communication device over a bandwidth-limited connection. An available space on the memory device of the communication device at a first time is less than a predetermined amount. The first time is before the receiving of the cleanup request. Data stored at the memory device of the communication device is deleted based on the cleanup request. An available-space indicator is sent from the communication device at a second time. The second time is after the first time and after the deleting of the data.

DETAILED DESCRIPTION

The invention relates to memory resource management for a communication device connected via one or more bandwidth-limited connections. Resource management can be initiated, for example, in response to a request for application-related information or based on a remote monitoring of the available space at the memory device of the communication device. In the case where the amount of available space on the memory device of the communication device is insufficient, information stored at the communication device can be temporarily uploaded before being deleted or, alternatively, can be deleted without being temporarily uploaded.

The term "bandwidth-limited connection" is used to include any type of connection where the bandwidth of the information desired to be transmitted exceeds the available bandwidth capacity of the connection. Such a bandwidth-limited connection can include, for example, a wireless data connection configured to send and/or receive multimedia content.

The term "download request" is used to mean any type of request or instruction sent from the communication device to a gateway via the mobile network whereby the communication device requests information to be downloaded through the gateway. Such a download request can be related to, for example, application-related information. The term "application-related information" is used to include information related to an application operable on the communication device. Such application-related information can include, for example, applications, application components or data used by an application.

The term "cleanup request" is used to mean any type of request or instruction sent from the gateway to the communication device via the mobile network whereby the gateway requests information to be deleted from the memory device of the communication device. The cleanup request can include, for example, an indication of the amount of memory space requested to be made available. The cleanup request can be sent, for example, in response to a download request being received from a communication device having insufficient available memory to handle the download of the requested application-related information. Alternatively, the cleanup request can be sent, for example, by a gateway in response to receiving an available-space indicator that indicates that the available space on the memory device of the communication device has fallen below a predetermined threshold or operating condition.

The term "available-space indicator" is used to mean any type of message or indication sent from the communication device to the gateway whereby the available-space indicator provides an indication of the amount of space available on the memory device of the communication device. An available-space indicator can be sent, for example, by the communication device in response to receiving a cleanup request after some information stored on the memory device of the communication device has been deleted.

Figure 1:
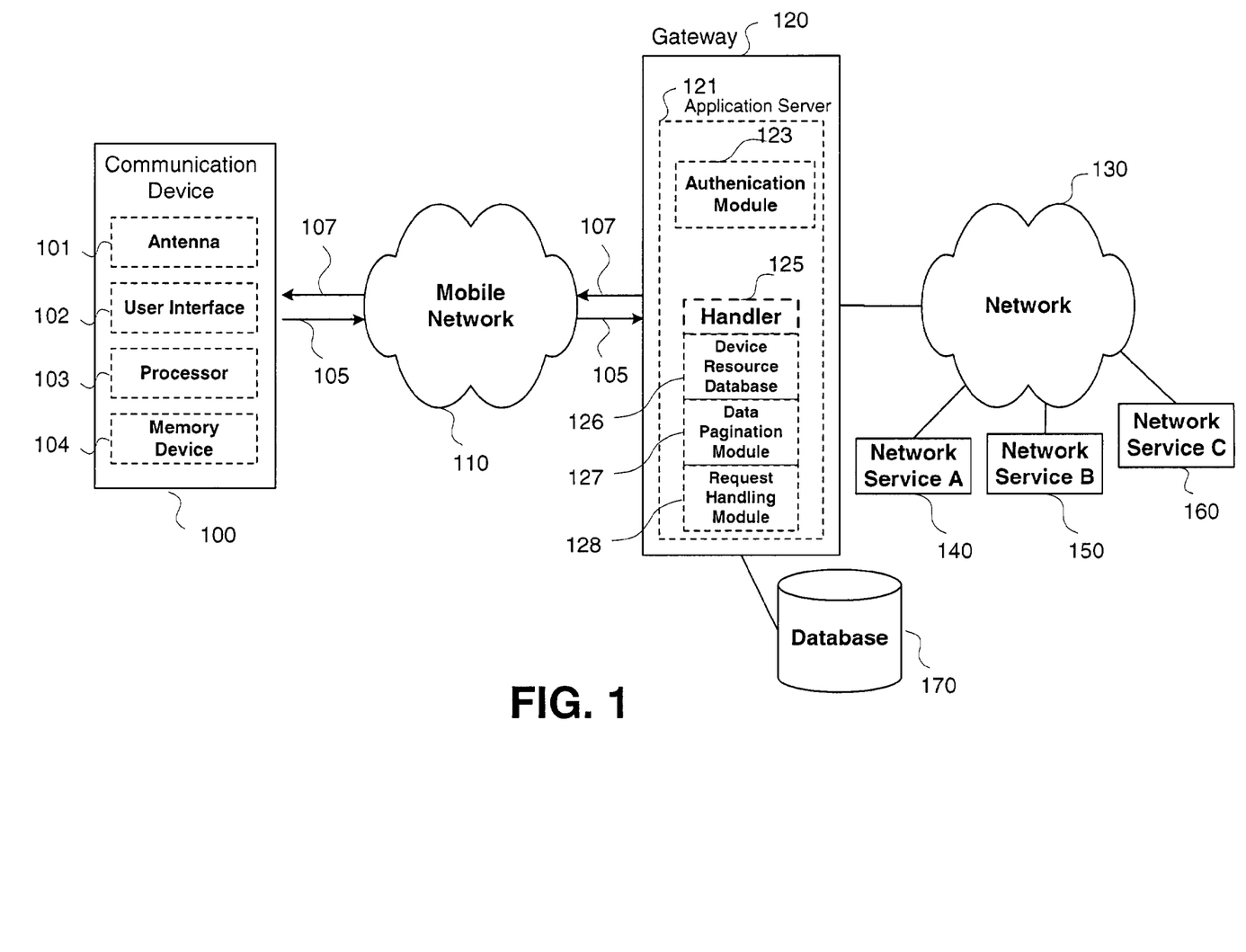
FIG. 1 shows a system block diagram of a communication network according to an embodiment of the invention.

FIG. 1 shows a system block diagram of a communication network according to an embodiment of the invention. Communication device 100 is coupled to gateway 120 through mobile network 110 by an uplink connection 105 and a downlink connection 107. Gateway 120 is coupled to network 130 and database 170. Network 130 is coupled to network service A 140, network service B 150 and network service C 160. Network services A 140, B 150 and C 160 can be any type of information stored at a network device that is remotely accessible. Such network services can be, for example, web-based multimedia content or a non-web-based software application.

Communication device 100 includes antenna 101, user interface 102, processor 103 and memory device 104. Gateway 120 includes application server 121, which includes authentication module 123 and handler 125. Handler 125 further includes device resource database 126, data pagination module 127 and request handling module 128. Application server 121 includes software configured to allow the functionality discussed below, including the functionality relating to the authentication module 123 and handler 125. Similarly, the memory device 104 of communication device 100 stores client-side software that is configured to operate with the software of application server 121. Note that although the software is described in terms of client and server software, any appropriate software configuration, such as distributed software, is possible.

The uplink connection 105 and downlink connection 107 are established for a particular communication device 100 for the duration of a session. In other words, once the communication device 100 is connected to the mobile network 110 via the uplink connection 105 and downlink connection 107, the session information associated with those connections is maintained during the duration of the session regardless of the particular status of the connections. Additional details of the uplink connection 105 and the downlink connection 107 are provided in co-pending U.S. patent application Ser. No. 10/224,331, entitled "Method and Apparatus for Establishing Multiple Bandwidth-Limited Connections for a Communication Device."

Figure 2:
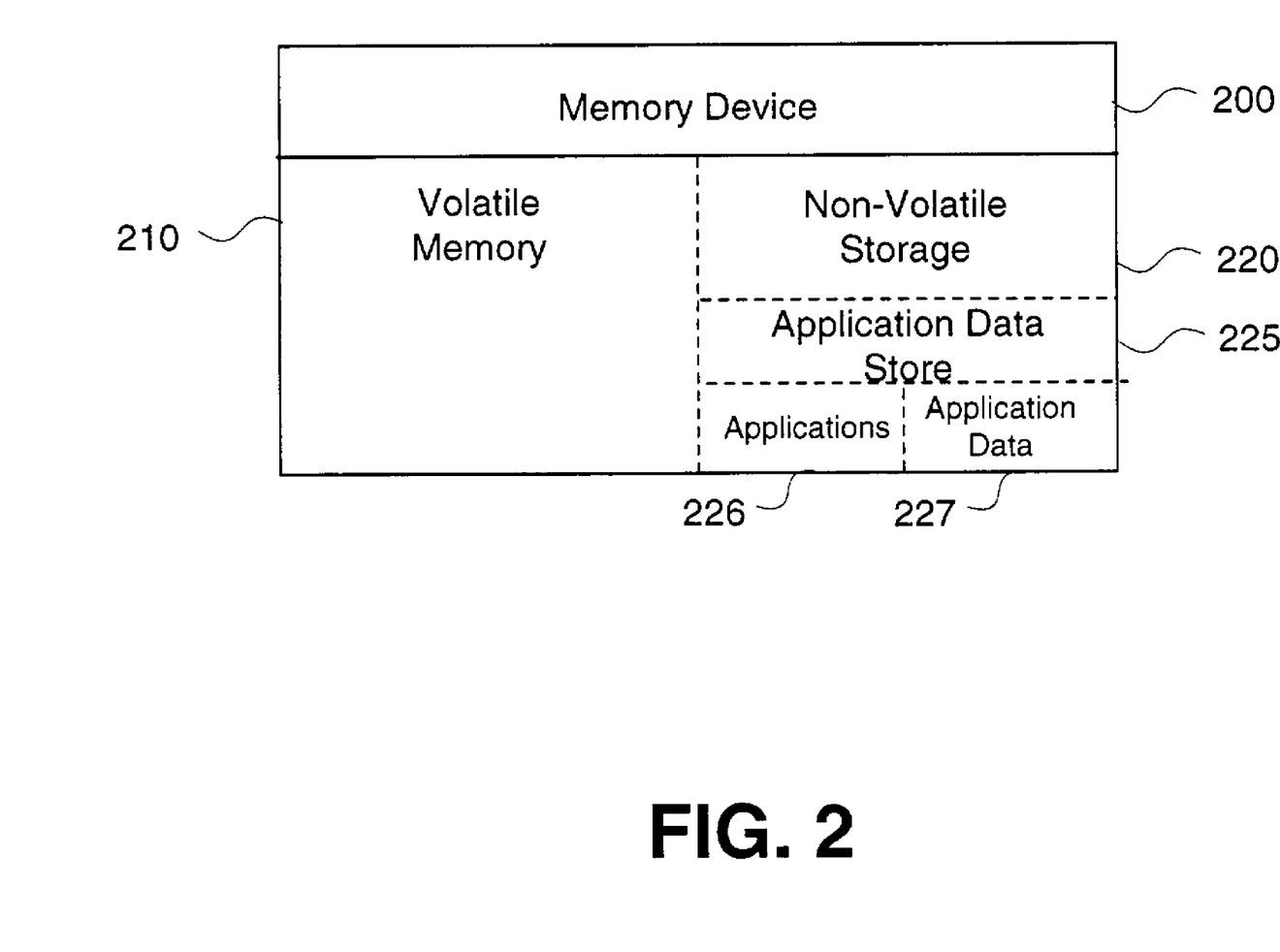
FIG. 2 shows a diagram of an example of a memory device of a communication device, according to an embodiment of the invention.

FIG. 2 shows a diagram of an example of a memory device of a communication device, according to an embodiment of the invention. More specifically, FIG. 2 shows an example of the memory device 104 of communication device 100 shown in FIG. 1. Memory device 200 includes a volatile memory 210 and a non-volatile storage 220. Non-volatile memory 220 further includes a memory portion where application data store 225 is stored. The application data store 225 can store application-related information such as applications 226 and application data 227.

Because application-related information provided to communication device 100 is stored in application data store 225 of non-volatile memory 220, the corresponding applications can be implemented on communication device 100 having its own device-specific software stored in the non-volatile storage 220. Thus, customized applications can be provisioned and executed on communication device 100 in a manner compatible with the preexisting software associated with communication device 100.

Although the memory device 200 is shown in FIG. 2 as having a volatile memory 210 and a non-volatile storage 220, other configurations are possible. For example, a memory device can include solely volatile memory or solely non-volatile memory. In either configuration, the application-related information can be stored in an appropriate portion of the memory device. Memory device 200 can be, for example, a pluggable memory module such as the Sony Memory Stick™ or a CompactFlash (CF) card.

Figure 3:
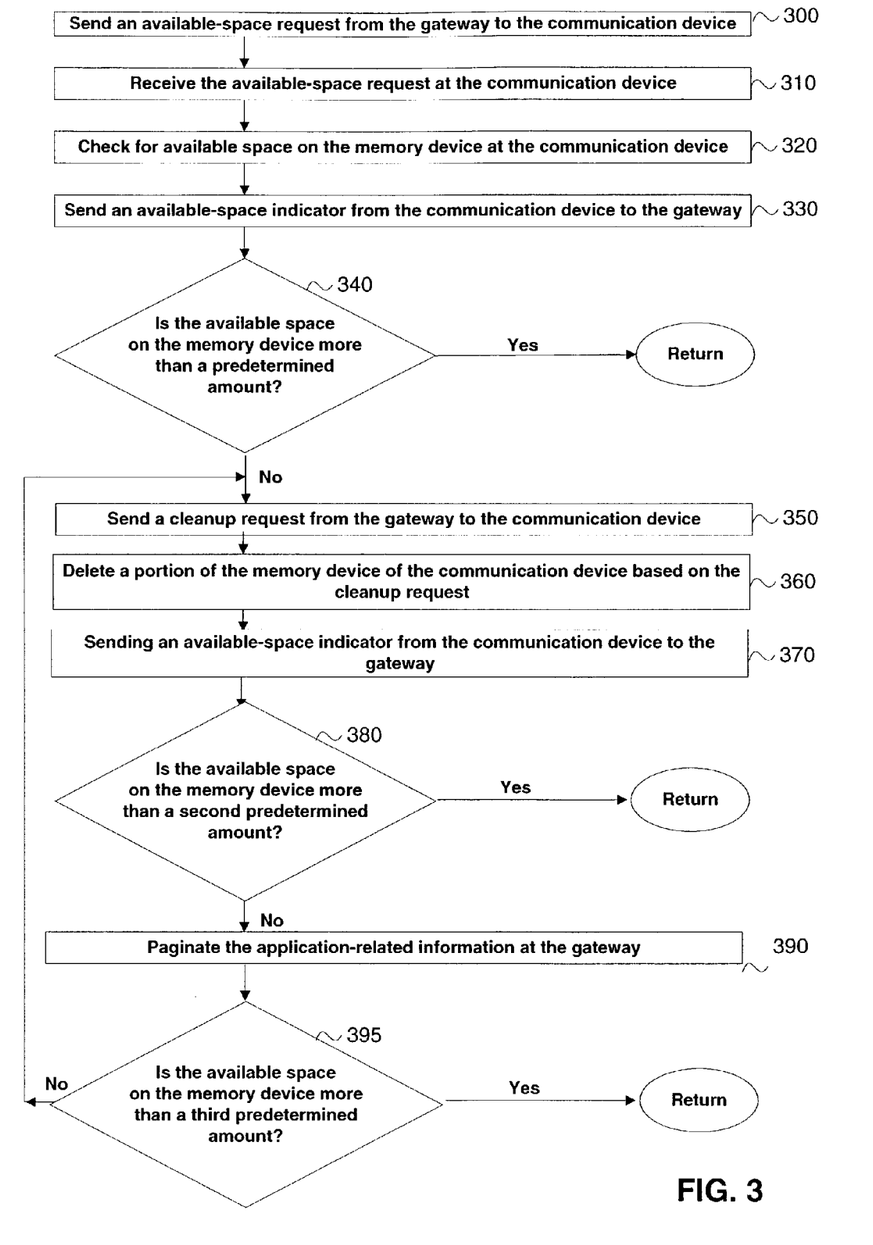
FIG. 3 shows a flowchart for performing resource management, according to an embodiment of the invention.

FIG. 3 shows a flowchart for performing resource management, according to an embodiment of the invention. Although FIG. 3 is described below in reference to the communication system of FIG. 1, the process of FIG. 3 can be applied to alternative configurations of communication systems.

At step 300, an available-space request is sent from the gateway 120 to the communication device 100. The available-space request can be, for example, a message that includes an application identifier and a time stamp indicating when the available-space request was sent. Such an available-space request can be sent in response to a download request being sent from the communication device to the gateway where the download request relates to requested application-related information. At step 310, communication device 100 receives the available-space request from gateway 120.

At step 320, the available space on the memory device 104 at communication device 100 is checked. The available space on the memory device can be performed, for example, through the use of an operating system on the communication device 100. Such an operating system can provide the amount of available space on memory device based on the file management capability of the operating system. The operating system, for example, can be stored within non-volatile storage 220 of memory device 200 and can provide an indication of the amount of available space in volatile memory 210. At step 330, the available-space indicator is sent from communication device 100 to gateway 120.

At conditional step 340, a determination is made as to whether the available space on the memory device is more than a predetermined amount. This predetermined amount can be, for example, a threshold plus the size of the application-related information sought to be downloaded to the communication device. The threshold value can be, for example, twenty-five percent of the total memory capacity of memory device 200, including volatile memory 210 and non-volatile memory 220. Based on this example of a threshold value, the available space on the memory device is more than the predetermined amount when at least twenty-five percent of the memory would still be available after downloading the application-related information sought to be downloaded to the communication device. Checking whether the available space on the memory device relative to the predetermined amount ensures that a sufficient amount of memory is available, for example, for routine operational purposes after the application-related information has been downloaded.

If the available space on the memory device is more than the predetermined amount, then the process returns. For example, the resource management method described in FIG. 3 can return to a just-in-time provisioning process described in the above-referred co-pending U.S. patent application Ser. No. 10/224,476, entitled "Method and Apparatus for Just-in-Time Provisioning Application-Related Information at a Communication Device." More specifically, where a user is attempting to execute an application, one or more portions of which are unavailable at communication device, those application portions can be provisioned as needed. Thus, following this example, if the available space on the memory device is more than the predetermined amount, then the just-in-time provisioning process can be resumed.

If the available space on the memory device is not more than the predetermined amount, then the process proceeds to step 350. At step 350, a cleanup request is sent from gateway 120 to communication device 100. At step 360, a portion of the memory device is deleted based on the cleanup request. For example, a portion of the application data store 225 can be deleted in response to the cleanup request. At step 370, an available-space indicator is sent from communication device 100 to gateway 120.

At conditional step 380, a determination is made as to whether the available space on the memory device is more than a second predetermined amount. This second predetermined amount can be, for example, a second threshold plus the size of the application-related information sought to be downloaded to the communication device. The second threshold value can be, for example, ten percent of the total memory capacity of memory device 200. Based on this example of a second threshold value, the available space on the memory device is more than the second predetermined amount when at least ten percent of the memory would still be available after downloading the application-related information sought to be downloaded to the communication device. Checking whether the available space on the memory device relative to the second predetermined ensures that a sufficient amount of memory is available, particularly after a first attempt at freeing up space on the memory device has already been performed (i.e., through step 360).

If the available space on the memory device is more than the second predetermined amount, then the process returns, for example, to the just-in-time provisioning process referred to above. If the available space on the memory device is not more than the second predetermined amount, then the process proceeds to step 390.

At step 390, the application-related information is paginated at the gateway 120. The application-related information can be paginated in the sense that the application-related information can be divided or segmented into discrete portions. For example, when an application is paginated, the resulting segments are referred to herein as application components. These application components are, for example, downloadable to the communication device 100 and usable by the application that requested the application-related information. Note that not all applications can be paginated. In such a case where an application cannot be paginated, the step 390 is not performed.

At conditional step 395, a determination is made as to whether the available space on the memory device is more than a third predetermined amount. The third predetermined amount can be, for example, the second threshold plus the size of the paginated application-related information. Based on this example, the available space on the memory device is more than the third predetermined amount when at least ten percent of the memory would still be available after downloading the paginated application-related information sought to be downloaded to the communication device. If the available space on the memory device is more than the third predetermined amount, then the process returns, for example, to the just-in-time provisioning process referred to above. If the available space on the memory device is not more than the third predetermined amount, then the process proceeds to step 350. This allows steps 350 through 380 to be repeated until a sufficient amount of memory has been freed up so that the paginated or non-paginated application-related information can be downloaded.

Although steps 390 and 395 relating to pagination are performed in a particular point in the process shown in FIG. 3, these steps can be performed at alternative points in the resource management process. For example, in an alternative embodiment, these pagination steps can be performed before sending the cleanup request and deleting a portion of the memory device of the communication device (shown in FIG. 3 as steps 350, 360 and 370). In this embodiment, cleanup of the memory device can presumably be performed less frequently because the requested application-related information is paginated into smaller portions before being downloaded to the communication device.

Although the process described in reference to FIG. 3 relates to resource management where application-related information is to be downloaded to the communication device, other embodiments are possible. For example, resource management can be performed independent of application-related information being downloaded.

In one alternative embodiment, the gateway 120 can periodically send an available-space request to the communication device 100 while it is connected to the gateway 120. This allows gateway 120 to monitor the amount of available memory at communication device 100. Then, based on the received available-space indicator, the gateway 120 can send a cleanup request to the communication device 100 so that it frees up memory space when the available memory space becomes too low. This embodiment would be similar to that described in reference to FIG. 3 except that conditional steps 340 and 380 are performed with respect to a threshold (e.g., ten percent of the memory device) without regard to specific application-related information. In another embodiment, the available-space requests are sent on a basis other than periodic such as, for example, random.

Figure 4:
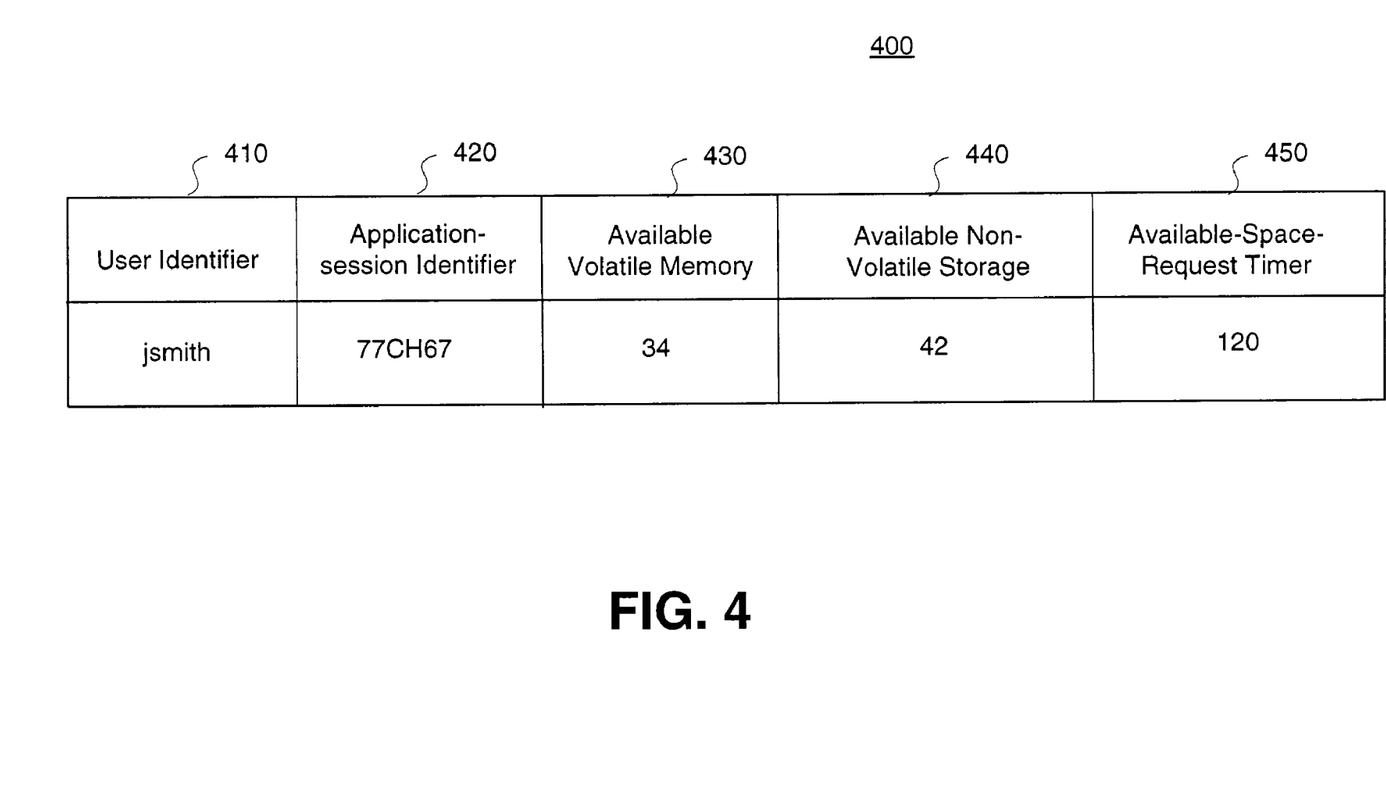
FIG. 4 shows an example of a database record in which information on the amount of memory available at a communication device is maintained, according to an embodiment of the invention.

In this embodiment where the gateway 120 can periodically send an available-space request to the communication device 100, the gateway 120 can maintain information on the amount of memory available at its associated communication devices (e.g., communication devices 100 also connected to gateway 120 but not shown in FIG. 1). FIG. 4 shows an example of a database record in which information on the amount of memory available at a communication device is maintained, according to an embodiment of the invention. Such database records can be stored, for example, in database 170 as shown in FIG. 1.

Database record 400 can include the following fields: user identifier 410, application-session identifier 420, available volatile memory 430, available non-volatile storage 440 and available-space-request timer 450. Database record 400 is shown in FIG. 4 with example values: user identifier 410 has a value "jsmith," application-session identifier 420 has a value "77CH67," available volatile memory 430 has a value of "34," available non-volatile storage 440 has a value of "42," and available-space-request timer 450 has a value of "10." These values of user identifier 410 and application-session identifier 420 can be determined as part of an earlier enrollment process as described in the above-referenced co-pending U.S. patent application Ser. No. 10/224,331, entitled "Method and Apparatus for Establishing Multiple Bandwidth-Limited Connections for a Communication Device."

The values for available volatile memory 430 and available non-volatile storage 440 can be provided based on the available-space indicator received at the gateway 120 by communication device 100. The available-space indicator can include, for example, a value of the space available in volatile memory 210 and a value of the space available in non-volatile memory 220. The available-space-request timer 450 can, for example, decrease over time so that when available-space-request timer 450 has a value of zero, gateway 120 can send an available-space request and the value of the available-space-request timer 450 can be reset to a starting value.

As discussed above in connection with FIG. 3 (e.g., step 360), when the memory device 200 of communication device 100 has an insufficient amount of space, a portion of the memory can be cleared to make room for subsequently provided information. Such subsequently provided information can be, for example, generated by the communication device 100 during the operation of an application or downloaded from gateway 120 upon an application-related information request. The application-related information stored in this portion of the memory can be, for example, sent to gateway 120 for storage (e.g., at a storage device coupled to gateway 120 and not shown in FIG. 1) before being deleted at the communication device. Such application-related information can be, for example, application data unique to the user such as contact or calendar information. In this manner, application-related information stored at the communication device can be, for example, temporarily uploaded and maintained in virtual storage while making memory space available at the communication device 100.

Alternatively, for certain applications, it may be appropriate to delete the application-related information without first uploading it to the gateway 120. Such application-related information can be, for example, standard (i.e., non-customized or non-user-specific) application information a copy of which can be downloaded from gateway 120 to communication device 100 whenever subsequently requested.

Figure 5:
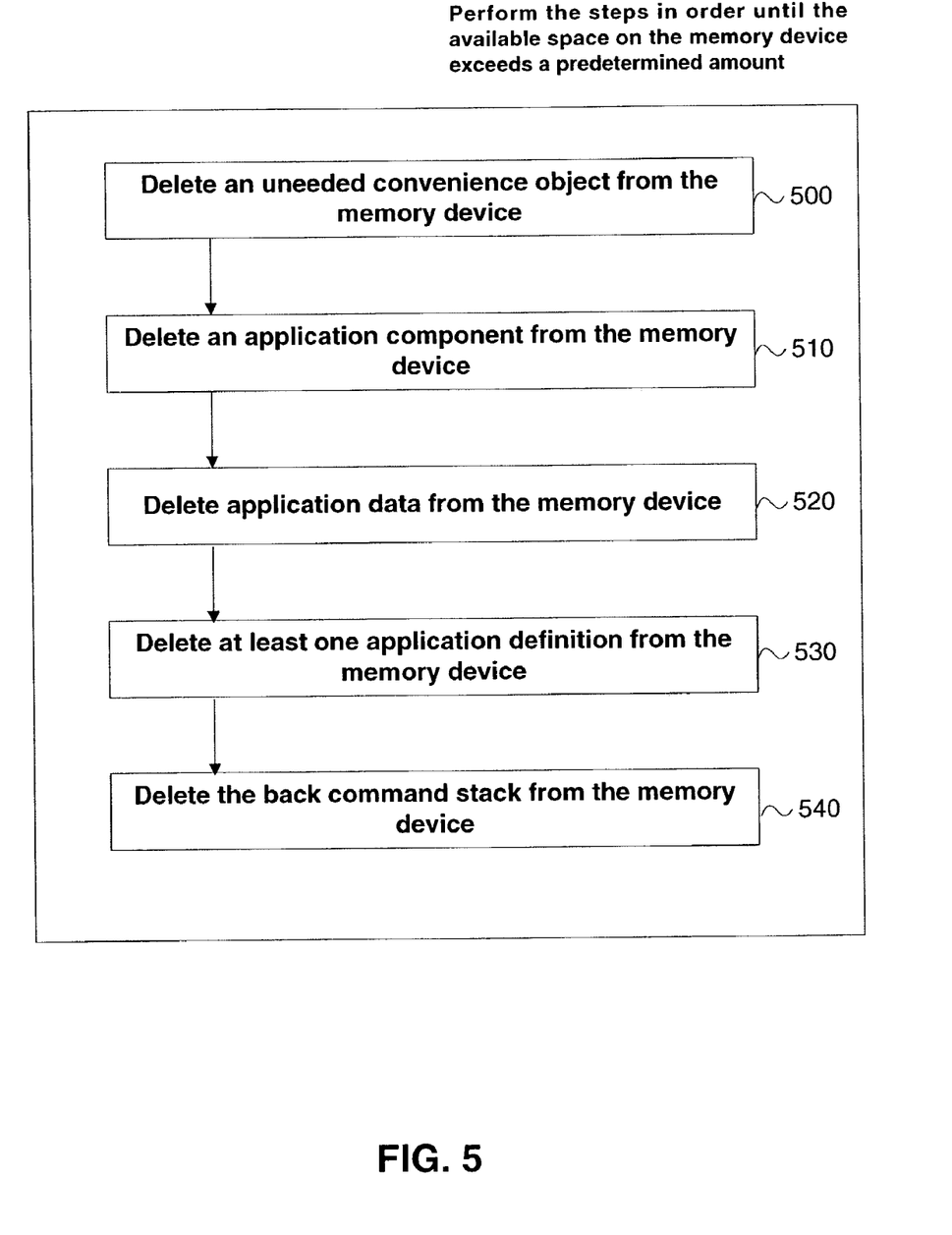
FIG. 5 shows a flowchart of a process for deleting a portion of the memory device of a communication device, according to an embodiment of the invention.

The particular manner in which a portion of the memory is deleted can be performed in a number of different ways. FIG. 5 shows a flowchart of a process for deleting a portion of the memory device of a communication device, according to an embodiment of the invention. As shown in FIG. 5, steps 500 through 540 can be performed in order until the available space on the memory device 200 of the communication device 100 exceeds a predetermined amount. In other words, step 500 is performed first, and then if the available space of memory space is insufficient, step 510 is performed, and so on.

At step 500, an unneeded convenience object is deleted from the memory device. At step 510, an application component is deleted from the memory device. An application component can be, for example, a screen definition, a command or a listener. At step 520, application data is deleted from the memory device. Application data can be, for example, an image such as a graphical-user interface (GUI) skin, a map, a graphic, or data unique to the user such as contact or calendar information. At step 530, at least one application definition is deleted from the memory device. Application definitions can include, for example, icon definitions, screen definitions, menu definitions, command definitions, drawing elements and associated data. At step 540, the back command stack is deleted from the memory device. The back command stack can be stored, for example, in volatile memory 210.

The method described in connection with FIGS. 2 through 5 can be implemented with any appropriate software that is compatible with communication device 100. For example, Java™ 2 Micro Edition (J2ME) is Sun Microsystem's version of Java™ configured for machines with limited hardware resources such as wireless phones, PDAs, and other consumer electronic and embedded devices. J2ME is configured to work with machines having as little as 128 KB of RAM and with processors much less powerful than those used on typical desktop and server machines. J2ME consists of a set of profiles each of which is defined for a particular type of device and consists of a minimum set of class libraries required for the particular type of device and a specification of a Java™ virtual machine required to support the device. Accordingly, the J2ME version of Java™ can be used to develop software that implements the methods discussed above in reference to FIGS. 2 through 5. For example, a portion of the software can reside on communication device 100 and a complementary portion of the software can reside on gateway 120.

Figure 6:
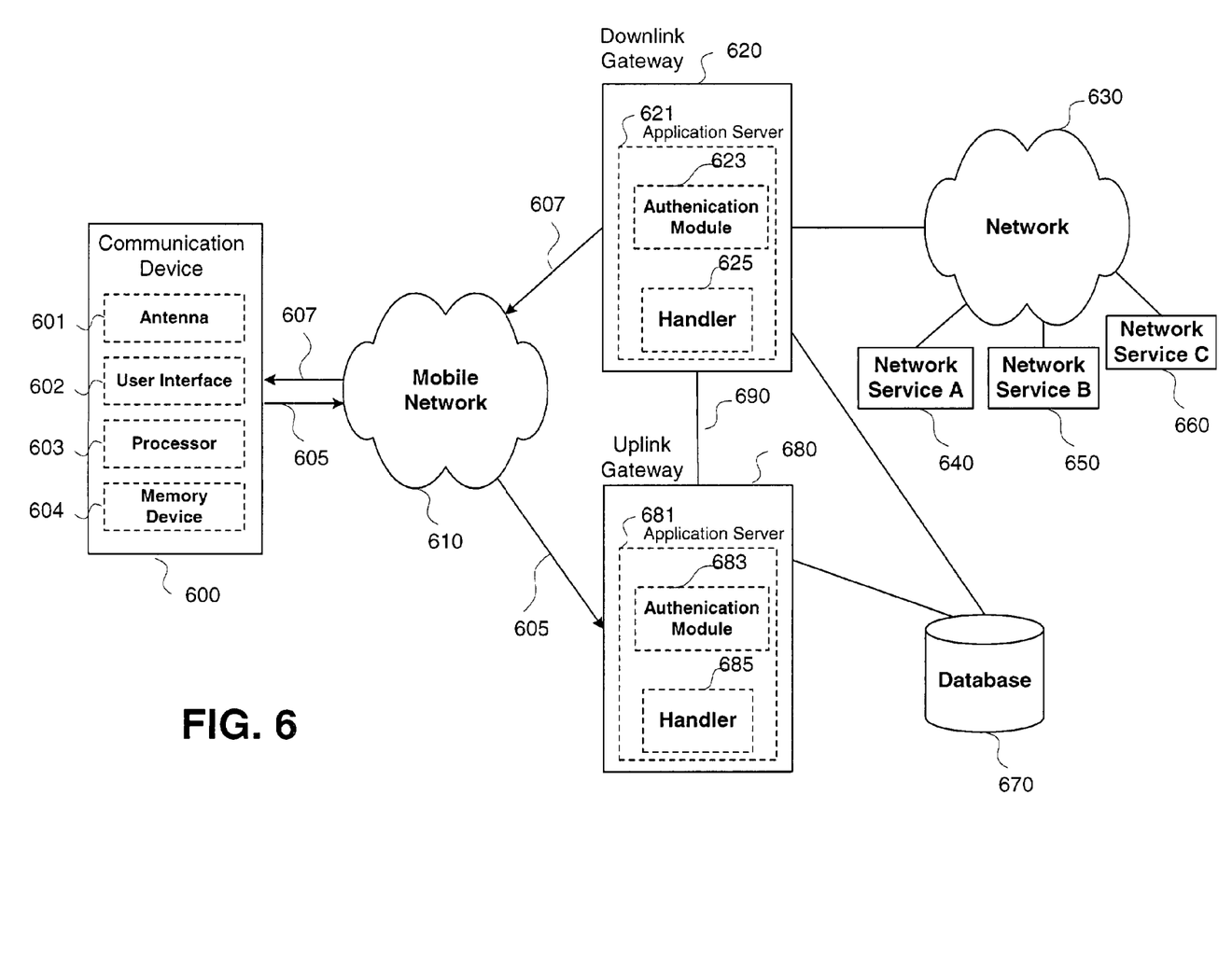
FIG. 6 shows a system block diagram of a communication network including distributed gateways, according to another embodiment of the invention.

FIG. 6 shows a system block diagram of a communication network including distributed gateways, according to another embodiment of the invention. Communication device 600 includes antenna 601, user interface 602, processor 603 and memory device 604. Communication device 600 is coupled to uplink gateway 680 through mobile network 610 by an uplink connection 605, and to downlink gateway 620 through mobile network 610 by a downlink connection 607. Gateways 620 and 680 are connected to each other by connection 690. Gateways 620 and 680 are also separately connected to database 670. In addition, gateway 620 is coupled to network 630. Network 630 is coupled to network service A 640, network service B 650 and network service C 660. Gateway 620 includes application server 621, which includes authentication module 623 and handler 625. Gateway 680 includes application server 681, which includes authentication module 683 and handler 685. Although not explicitly shown in FIG. 6, handlers 625 and 685 each further include a device resource database, data pagination module and request handling module as discussed in reference to FIG. 1.

Application servers 621 and 681 each include software configured to allow the functionality discussed above, including the functionality relating to the authentication modules 623 and 683, and handlers 625 and 685, respectively. Similarly, communication device 600 includes client-side software that is configured to operate with the software of application servers 621 and 681. Note that although the software is described in terms of client and server software, any appropriate software configuration, such as distributed software, is possible. The uplink connection 605 and downlink connection 607 are established for a particular communication device 600 for the duration of a session, as described in co-pending U.S. patent application Ser. No.

10/224,331, entitled "Method and Apparatus for Establishing Multiple Bandwidth-Limited Connections for a Communication Device."

In a distributed configuration, resource management can be performed independent of application-related information being downloaded. As shown in FIG. 6, downlink gateway 620 can periodically send an available-space request to the communication device 600 while it is connected to the downlink gateway 620. The corresponding available-space indicator sent by communication device 600 can then be sent to uplink gateway 680. Uplink gateway 680 can communicate the available-space indicator with downlink gateway 620 via connection 690. Then, based on the available-space indicator, downlink gateway 620 can send a cleanup request to the communication device 600 so that it frees up of memory space when the available memory space becomes to low.

Moreover, application-related information can be uploaded to and downloaded from different devices via different connections. In particular, when communication device 600 uploads information before deleting it from its memory device as described above, communication device 600 can upload the information to uplink gateway 680 via uplink connection 605. When communication device 600 receives information in response to an application-related request, communication device 600 can receive the information downloaded from downlink gateway 620 via downlink connection 607.

Although FIG. 6 shows a communication network with two distributed gateways, other configurations of distributed gateways are possible. For example, in embodiments where a communication device is associated with multiple downlink connections, these downlink connections can be distributed across multiple downlink gateways. For a specific example, where a communication device is associated with three downlink connections and three distributed downlink gateways, these three connections each can be uniquely associated with one of the three downlink gateways (each downlink connection being uniquely associated with one downlink gateway). Where a communication device is associated with three downlink connections and two distributed downlink gateways, two downlink connections can be associated with one downlink gateway and the remaining downlink connection can be associated with the remaining downlink gateway.

Similar to the above-described embodiments with multiple downlink connections and distributed downlink gateways, embodiments with multiple uplink connections and distributed uplink gateways are also possible. Alternatively, embodiments with both multiple downlink connections, and distributed downlink gateways, and multiple uplink connections and distributed uplink gateways are also possible.

CONCLUSION

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents.

The previous description of the embodiments is provided to enable any person skilled in the art to make or use the invention. While the invention has been particularly shown and described with reference to embodiments thereof, it will be understood by those skilled in the art that various changes in form and details may be made therein without departing from the spirit and scope of the invention.

What is claimed is:

1. A method for managing resources at a communication device having its own memory device, comprising:
   receiving a cleanup request at the communication device from a gateway over a bandwidth-limited connection independent of a download request from the communication device, the gateway connecting a first network to a mobile network associated with the communication device and different from the first network, an available space on the memory device of the communication device at a first time being less than a predetermined amount, the first time being before the receiving of the cleanup request;
   deleting data stored at the memory device of the communication device based on the cleanup request, the deleting including deleting at least two of the following (a) through (e) until the available space on the memory device of the communication device exceeds the predetermined amount, the deleting occurring in order (a) through (e):
   (a) an unneeded convenience object from the memory device of the communication device;
   (b) an application component from a plurality of application components from the memory of the communication device;
   (c) application data from the memory device of the communication device;
   (d) at least one application definition from a plurality of application definitions from the memory device of the communication device; and
   (e) a back command stack from the memory device of the communication device; and
   sending an available-space indicator from the communication device to the gateway at a second time, the second time being after the first time and after the deleting of the data.

2. The method of claim 1, wherein the predetermined amount corresponds to a threshold that is independent of a size of an application-related information.

3. The method of claim 1, further comprising:
   receiving, periodically, an available-space request at the communication device; and
   sending an available-space indicator in response to each available-space request received at the communication device.

4. The method of claim 3, further comprising:
   deleting data stored at the memory device of the communication device based on each received available-space request if an available space on the memory device of the communication is less than a second predetermined amount when the respective available-space request is received,
   the available-space indicator being sent after the respective available-space request is received.

5. The method of claim 1, further comprising:
   receiving an application-related request from a user, the application-related request being associated with an application-related information, the application-related information being associated with a download request; and
   sending, when information associated with the application-related request is not stored on the memory device of the communication device, the download request from the communication device at the first time.

6. The method of claim 5, further comprising:
receiving a second cleanup request at the communication device when an available space on the memory device of the communication device at the second time is less than the predetermined amount;
deleting data stored at a portion of the memory device of the communication device based on the second cleanup request;
sending an available-space indicator from the communication device at a third time, the third time being after the second time; and
receiving the application-related information when an available space on the memory device of the communication device at the third time is greater than a second predetermined amount, the second predetermined amount being less than the predetermined amount.

7. The method of claim 1, further comprising:
receiving an application-related information when an available space on the memory device of the communication device at the second time is greater than the predetermined amount,
the application-related information being a first page from a plurality of pages associated with an application,
the available space on the memory device of the communication device at the second time being greater than a second predetermined amount, the second predetermined amount being based on a size of the first page.

8. A method for managing resources of a communication device having its own memory device, comprising:
sending an available-space request from a gateway to the communication device independent of a download request from the communication device, the gateway connecting a first network to a mobile network associated with the communication device and different from the first network;
receiving a first available-space indicator at the gateway from the communication device at a first time over a bandwidth-limited connection; and
performing, after receiving the first available-space indicator, the following steps when an available space on the memory device of the communication device is less than a predetermined amount:
sending a cleanup request from the gateway to the communication device independent of a download request from the communication device; and
receiving a second available-space indicator at the gateway from the communication device based on a deletion of data stored on a portion of the memory device of the communication device, the deletion of data being in response to the cleanup request and including deleting at least two of the following (a) through (e) until the available-space on the memory device of the communication device exceeds the predetermined amount, the deleting occurring in order (a) through (e):
(a) an unneeded convenience object from the memory device of the communication device;
(b) an application component from a plurality of application components from the memory device of the communication device;
(c) application data from the memory device of the communication device;
(d) at least one application definition from a plurality of application definitions from the memory device of the communication device; and
(e) a back command stack from the memory device of the communication device.

9. The method of claim 8, wherein the predetermined amount corresponds to a threshold that is independent of a size of an application-related information.

10. The method of claim 8, wherein:
the sending of the available-space request to the communication device is performed periodically,
an available-space indicator being received in response to each available-space request sent to the communication device.

11. The method of claim 10, wherein:
data stored at the memory device of the communication device is deleted based on each sent available-space request if an available space on the memory device of the communication is less than a second predetermined amount when the respective available-space request is sent,
each available-space indicator being received after the respective available-space request is sent.

12. A communication device, comprising:
a processor,
a memory device coupled to the processor, an available space on the memory device at a first time being less than a predetermined amount, the memory device configured to store instructions that, when executed by the processor, cause the processor to:
delete data stored at the memory device of the communication device based on a cleanup request received from a gateway over a bandwidth-limited connection independent of a download request from the communication device, the gateway connecting a first network to a mobile network associated with the communication device and different from the first network, the delete including deleting at least two of the following (a) through (e) until the available-space on the memory device of the communication device exceeds the predetermined amount, the deleting occurring in order (a) through (e):
(a) an unneeded convenience object from the memory device of the communication device;
(b) a screen definition from a plurality of screen definitions from the memory device of the communication device;
(c) application data from the memory device of the communication device;
(d) at least one application definition from a plurality of application definitions from the memory device of the communication device; and
(e) a back command stack from the memory device of the communication device; and
send an available-space indicator to the gateway at a second time, the second time being after the first time and after the deleting of the data.

13. The communication device of claim 12, wherein the memory device is configured to store further instructions that, when executed by the processor, cause the processor to:
receive, periodically, an available-space request at the communication device; and
send an available-space indicator in response to each available-space request received at the communication device.

14. The communication device of claim 12, wherein the memory device is configured to store further instructions that, when executed by the processor, cause the processor to:
receive, periodically, an available-space request at the communication device;

send an available-space indicator in response to each available-space request received at the communication device; and delete data stored at the memory device of the communication device based on each received available-space request if an available space on the memory device of the communication is less than a second predetermined amount when the respective available-space request is received, the available-space indicator being sent after the respective available-space request is received.

15. The communication device of claim 12, wherein:

the memory device is configured to store further instructions that, when executed by the processor, cause the processor to send a download request at the first time when application-related information associated with an application-related request is not stored on the memory device.

16. The communication device of claim 15, wherein:

the memory device is configured to store further instructions that, when executed by the processor, cause the processor to:

receive a second cleanup request when an available space on the memory device at the second time is less than the predetermined amount;

delete data stored at a portion of the memory device of the communication device based on the second cleanup request;

send an available-space indicator from the communication device at a third time, the third time being after the second time; and receive the application-related information when an available space on the memory device of the communication device at the third time is greater than a second predetermined amount, the second predetermined amount being less than the predetermined amount.

17. The communication device of claim 12, wherein:

the memory device is configured to store further instructions that, when executed by the processor, cause the processor to:

receive the application-related information when an available space on the memory device at the second time is greater than the predetermined amount, the application-related information being a first page from a plurality of pages associated with an application, the available space on the memory device at the second time being greater than a second predetermined amount, the second predetermined amount being based on a size of the first page.

18. A processor-readable medium storing code representing instructions to cause a processor to perform a process, the code comprising code to:

send an available-space request from a gateway to the communication device independent of a download request from the communication device, the gateway connecting a first network to a mobile network associated with the communication device and different from the first network;

receive a first available-space indicator at the gateway from a communication device at a first time over a bandwidth-limited connection; and perform, after receiving the first available-space indicator, the following steps when an available space on the memory device of the communication device is less than a predetermined amount:

sending a cleanup request from the gateway to the communication device independent of a download request from the communication device; and receiving a second available-space indicator at the gateway from the communication device based on a deletion of data stored on a portion of the memory device of the communication device, the deletion of data being in response to the cleanup request and including deleting at least two of the following (a) through (e) until the available-space on the memory device of the communication device exceeds the predetermined amount, the deleting occurring in order (a) through (e):

(a) an unneeded convenience object from the memory device of the communication device;

(b) an application component from a plurality of application components from the memory device of the communication device;

(c) application data from the memory device of the communication device;

(d) at least one application definition from a plurality of application definitions from the memory device of the communication device; and (e) the back command stack from the memory device of the communication device.

19. The processor-readable medium of claim 18, wherein the predetermined amount corresponds to a threshold that is independent of a size of an application-related information.

20. The processor-readable medium of claim 18, wherein the code further includes code to:

send, periodically, the available-space request to the communication device; and receive an available-space indicator in response to each available-space request sent to the communication device.

21. The processor-readable medium of claim 18, wherein the code further includes code to:

send a second cleanup request to the communication device when an available space on the memory device of the communication at the second time is less than the predetermined amount.

22. A processor-readable medium storing code representing instructions to cause a processor to perform a process, the code comprising code to:

receive a cleanup request at a communication device from a gateway over a bandwidth-limited connection independent of a download request from the communication device, the gateway connecting a first network to a mobile network associated with the communication device and different from the first network, an available space on a memory device of the communication device at a first time being less than a predetermined amount, the first time being before the receiving of the cleanup request;

delete data stored at the memory device of the communication device based on the cleanup request, the delete including deleting at least two of the following (a) through (e) until the available-space on the memory device of the communication device exceeds the predetermined amount, the deleting occurring in order (a) through (e):

(a) an unneeded convenience object from the memory device of the communication device;

(b) an application component from a plurality of application components from the memory device of the communication device;

(c) application data from the memory device of the communication device;

(d) at least one application definition from a plurality of application definitions from the memory device of the communication device; and (e) a back command stack from the memory device of the communication device; and send an available-space indicator from the communication device to the gateway at a second time, the second time being after the first time and after the deleting of the data.

23. The processor-readable medium of claim 22, wherein the code further includes code to:

receive, periodically, an available-space request at the communication device; and send an available-space indicator in response to each available-space request received at the communication device.

24. The processor-readable medium of claim 23, wherein the code further includes code to:

delete data stored at the memory device of the communication device based on each received available-space request if an available space on the memory device of the communication is less than a second predetermined amount_when the respective available-space request is received, the available-space indicator being sent after the respective available-space request is received.

25. The processor-readable medium of claim 22, wherein the code further includes code to:

receive an application-related request from the user, the application-related request being associated with the application-related information; and send, when information associated with the application-related request is not stored on the memory device of the communication device, a download request from the communication device at the first time.

26. The processor-readable medium of claim 25, wherein the code further includes code to:

receive a second cleanup request at the communication device when an available space on the memory device of the communication device at the second time is less than the predetermined amount;

delete data stored at a portion of the memory device of the communication device based on the second cleanup request;

send an available-space indicator from the communication device at a third time, the third time being after the second time; and receive the application-related information when an available space on the memory device of the communication device at the third time is greater than a second predetermined amount, the second predetermined amount being less than the predetermined amount.

27. The processor-readable medium of claim 22, wherein the code further includes code to:

receive the application-related information when an available space on the memory device of the communication device at the second time is greater than the predetermined amount, the application-related information being a first page from a plurality of pages associated with an application, the available space on the memory device of the communication device at the second time being greater than a second predetermined amount, the second predetermined amount being based on a size of the first page.

* * * * *